United States Patent
Yancey et al.

(10) Patent No.: US 9,361,366 B1
(45) Date of Patent: Jun. 7, 2016

(54) METHOD AND SYSTEM FOR CONTROLLING ACCESS TO A MULTI-TENANT DATABASE SYSTEM USING A VIRTUAL PORTAL

(75) Inventors: Scott Yancey, San Francisco, CA (US); Kedar Doshi, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 847 days.

(21) Appl. No.: 12/132,409

(22) Filed: Jun. 3, 2008

(51) Int. Cl.
*G06F 17/30* (2006.01)

(52) U.S. Cl.
CPC .... *G06F 17/30699* (2013.01); *G06F 17/30867* (2013.01)

(58) Field of Classification Search
CPC .................... G06F 17/30867; G06F 17/30699
USPC ................................................. 707/694, 783
See application file for complete search history.

(56) References Cited

U.S. PATENT DOCUMENTS

| | | | |
|---|---|---|---|
| 5,072,370 A | 12/1991 | Durdik | |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,787,437 A | 7/1998 | Potterveld et al. | |
| 5,794,232 A | 8/1998 | Mahlum et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,941,947 A * | 8/1999 | Brown et al. | 709/225 |
| 5,950,190 A | 9/1999 | Yeager et al. | |
| 5,963,953 A | 10/1999 | Cram et al. | |
| 5,974,409 A | 10/1999 | Sanu et al. | |
| 5,987,471 A | 11/1999 | Bodine et al. | |
| 6,064,656 A * | 5/2000 | Angal et al. | 370/254 |
| 6,085,191 A * | 7/2000 | Fisher et al. | 707/737 |
| 6,092,083 A | 7/2000 | Brodersen et al. | |
| 6,112,198 A | 8/2000 | Lohman et al. | |
| 6,169,534 B1 | 1/2001 | Raffel et al. | |
| 6,178,425 B1 | 1/2001 | Brodersen et al. | |

(Continued)

FOREIGN PATENT DOCUMENTS

WO  2004059420  7/2004

OTHER PUBLICATIONS

[online];[published on Oct. 17, 2008];[retrieved on Feb. 26, 2010]; retrieved from http://en.wikipedia.org/wiki/Push_technology.

(Continued)

*Primary Examiner* — James Trujillo
*Assistant Examiner* — Kurt Mueller
(74) *Attorney, Agent, or Firm* — Blakely, Sokoloff, Taylor & Zafman (57) ABSTRACT

In accordance with embodiments, there are provided mechanisms and methods for controlling access to a multi-tenant database system using a virtual portal. These mechanisms and methods for controlling access to a multi-tenant database system using a virtual portal can enable embodiments to provide great flexibility to a tenant of the architecture to select the content that may be perceived by the tenant users while allowing the owner of the architecture control over the content.

19 Claims, 6 Drawing Sheets

(56) References Cited

U.S. PATENT DOCUMENTS

| Patent Number | | Date | Inventor(s) | Ref |
|---|---|---|---|---|
| 6,189,000 | B1 | 2/2001 | Gwertzman et al. | |
| 6,189,011 | B1 | 2/2001 | Lim et al. | |
| 6,216,135 | B1 | 4/2001 | Brodersen et al. | |
| 6,219,667 | B1 * | 4/2001 | Lu et al. | 707/763 |
| 6,226,641 | B1 * | 5/2001 | Hickson et al. | 1/1 |
| 6,233,617 | B1 | 5/2001 | Rothwein et al. | |
| 6,233,618 | B1 * | 5/2001 | Shannon | 709/229 |
| 6,266,669 | B1 | 7/2001 | Brodersen et al. | |
| 6,295,530 | B1 | 9/2001 | Ritchie et al. | |
| 6,324,568 | B1 | 11/2001 | Diec | |
| 6,324,693 | B1 | 11/2001 | Brodersen et al. | |
| 6,330,560 | B1 | 12/2001 | Harrison et al. | |
| 6,336,137 | B1 | 1/2002 | Lee et al. | |
| 6,341,288 | B1 | 1/2002 | Yach et al. | |
| 6,345,288 | B1 * | 2/2002 | Reed et al. | 709/201 |
| D454,139 | S | 3/2002 | Feldcamp | |
| 6,367,077 | B1 | 4/2002 | Brodersen et al. | |
| 6,393,605 | B1 | 5/2002 | Loomans | |
| 6,405,220 | B1 | 6/2002 | Brodersen et al. | |
| 6,434,550 | B1 | 8/2002 | Warner et al. | |
| 6,438,562 | B1 | 8/2002 | Gupta et al. | |
| 6,446,089 | B1 | 9/2002 | Brodersen et al. | |
| 6,446,109 | B2 | 9/2002 | Gupta | |
| 6,453,038 | B1 | 9/2002 | McFarlane et al. | |
| 6,535,909 | B1 | 3/2003 | Rust | |
| 6,549,908 | B1 | 4/2003 | Loomans | |
| 6,553,563 | B2 | 4/2003 | Ambrose et al. | |
| 6,560,461 | B1 | 5/2003 | Fomukong et al. | |
| 6,574,635 | B2 | 6/2003 | Stauber et al. | |
| 6,577,726 | B1 | 6/2003 | Huang et al. | |
| 6,578,037 | B1 * | 6/2003 | Wong et al. | 707/694 |
| 6,601,087 | B1 | 7/2003 | Zhu et al. | |
| 6,604,117 | B2 | 8/2003 | Lim et al. | |
| 6,604,128 | B2 | 8/2003 | Diec | |
| 6,609,148 | B1 | 8/2003 | Salo et al. | |
| 6,609,150 | B2 | 8/2003 | Lee et al. | |
| 6,621,834 | B1 | 9/2003 | Scherpbier et al. | |
| 6,654,032 | B1 | 11/2003 | Zhu et al. | |
| 6,658,417 | B1 * | 12/2003 | Stakutis et al. | |
| 6,665,648 | B2 | 12/2003 | Brodersen et al. | |
| 6,665,655 | B1 | 12/2003 | Warner et al. | |
| 6,684,438 | B2 | 2/2004 | Brodersen et al. | |
| 6,711,565 | B1 | 3/2004 | Subramaniam et al. | |
| 6,721,765 | B2 | 4/2004 | Ghosh et al. | |
| 6,724,399 | B1 | 4/2004 | Katchour et al. | |
| 6,728,702 | B1 | 4/2004 | Subramaniam et al. | |
| 6,728,960 | B1 | 4/2004 | Loomans | |
| 6,732,095 | B1 | 5/2004 | Warshavsky et al. | |
| 6,732,100 | B1 | 5/2004 | Brodersen et al. | |
| 6,732,111 | B2 | 5/2004 | Brodersen et al. | |
| 6,754,681 | B2 | 6/2004 | Brodersen et al. | |
| 6,763,351 | B1 | 7/2004 | Subramaniam et al. | |
| 6,763,501 | B1 | 7/2004 | Zhu et al. | |
| 6,768,904 | B2 | 7/2004 | Kim | |
| 6,782,383 | B2 | 8/2004 | Subramaniam et al. | |
| 6,804,330 | B1 | 10/2004 | Jones et al. | |
| 6,826,565 | B2 | 11/2004 | Ritchie et al. | |
| 6,826,582 | B1 | 11/2004 | Chatterjee et al. | |
| 6,826,745 | B2 | 11/2004 | Coker et al. | |
| 6,829,655 | B1 | 12/2004 | Huang et al. | |
| 6,839,608 | B2 | 1/2005 | Sarabi et al. | |
| 6,842,748 | B1 | 1/2005 | Warner et al. | |
| 6,850,895 | B2 | 2/2005 | Brodersen et al. | |
| 6,850,949 | B2 | 2/2005 | Warner et al. | |
| 6,944,133 | B2 | 9/2005 | Wisner et al. | |
| 6,947,927 | B2 | 9/2005 | Chaudhuri et al. | |
| 7,076,633 | B2 | 7/2006 | Tormasov et al. | |
| 7,152,109 | B2 | 12/2006 | Suorsa et al. | |
| 7,174,483 | B2 | 2/2007 | Becher et al. | |
| 7,185,192 | B1 * | 2/2007 | Kahn | 713/155 |
| 7,206,805 | B1 | 4/2007 | McLaughlin, Jr. | |
| 7,206,807 | B2 | 4/2007 | Cheenath | |
| 7,209,929 | B2 | 4/2007 | Dominguez, Jr. et al. | |
| 7,249,118 | B2 | 7/2007 | Sandler et al. | |
| 7,305,577 | B2 | 12/2007 | Zhang | |
| 7,308,704 | B2 * | 12/2007 | Vogel et al. | 726/2 |
| 7,340,411 | B2 | 3/2008 | Cook | |
| 7,373,364 | B1 | 5/2008 | Chapman | |
| 7,448,079 | B2 | 11/2008 | Tremain | |
| 7,484,219 | B2 | 1/2009 | Mitra | |
| 7,577,092 | B2 | 8/2009 | San Andres et al. | |
| 7,580,975 | B2 | 8/2009 | Cheenath | |
| 7,599,953 | B2 | 10/2009 | Galindo-Legaria et al. | |
| 7,620,655 | B2 | 11/2009 | Larsson et al. | |
| 7,693,820 | B2 | 4/2010 | Larson et al. | |
| 7,814,470 | B2 | 10/2010 | Mamou et al. | |
| 2001/0023440 | A1 | 9/2001 | Franklin et al. | |
| 2001/0044791 | A1 | 11/2001 | Richter et al. | |
| 2002/0022986 | A1 | 2/2002 | Coker et al. | |
| 2002/0029161 | A1 | 3/2002 | Brodersen et al. | |
| 2002/0029376 | A1 | 3/2002 | Ambrose et al. | |
| 2002/0035577 | A1 | 3/2002 | Brodersen et al. | |
| 2002/0042264 | A1 | 4/2002 | Kim | |
| 2002/0042843 | A1 | 4/2002 | Diec | |
| 2002/0072951 | A1 | 6/2002 | Lee et al. | |
| 2002/0082892 | A1 | 6/2002 | Raffel et al. | |
| 2002/0129352 | A1 | 9/2002 | Brodersen et al. | |
| 2002/0133392 | A1 | 9/2002 | Angel et al. | |
| 2002/0140731 | A1 | 10/2002 | Subramaniam et al. | |
| 2002/0143997 | A1 | 10/2002 | Huang et al. | |
| 2002/0152102 | A1 | 10/2002 | Brodersen et al. | |
| 2002/0161734 | A1 | 10/2002 | Stauber et al. | |
| 2002/0162090 | A1 | 10/2002 | Parnell et al. | |
| 2002/0165742 | A1 | 11/2002 | Robins | |
| 2003/0004971 | A1 | 1/2003 | Gong et al. | |
| 2003/0018705 | A1 | 1/2003 | Chen et al. | |
| 2003/0018830 | A1 | 1/2003 | Chen et al. | |
| 2003/0066031 | A1 | 4/2003 | Laane | |
| 2003/0066032 | A1 | 4/2003 | Ramachandran et al. | |
| 2003/0069936 | A1 | 4/2003 | Warner et al. | |
| 2003/0070000 | A1 | 4/2003 | Coker et al. | |
| 2003/0070004 | A1 | 4/2003 | Mukundan et al. | |
| 2003/0070005 | A1 | 4/2003 | Mukundan et al. | |
| 2003/0074418 | A1 | 4/2003 | Coker | |
| 2003/0088545 | A1 | 5/2003 | Subramaniam et al. | |
| 2003/0120675 | A1 | 6/2003 | Stauber et al. | |
| 2003/0151633 | A1 | 8/2003 | George et al. | |
| 2003/0159136 | A1 | 8/2003 | Huang et al. | |
| 2003/0187921 | A1 | 10/2003 | Diec | |
| 2003/0189600 | A1 | 10/2003 | Gune et al. | |
| 2003/0191743 | A1 | 10/2003 | Brodersen et al. | |
| 2003/0204427 | A1 | 10/2003 | Gune et al. | |
| 2003/0206192 | A1 | 11/2003 | Chen et al. | |
| 2003/0225730 | A1 | 12/2003 | Warner et al. | |
| 2004/0001092 | A1 | 1/2004 | Rothwein et al. | |
| 2004/0010489 | A1 | 1/2004 | Rio | |
| 2004/0015578 | A1 | 1/2004 | Karakashian et al. | |
| 2004/0015981 | A1 | 1/2004 | Coker et al. | |
| 2004/0027388 | A1 | 2/2004 | Berg et al. | |
| 2004/0044656 | A1 | 3/2004 | Cheenath | |
| 2004/0045004 | A1 | 3/2004 | Cheenath | |
| 2004/0064503 | A1 | 4/2004 | Karakashian et al. | |
| 2004/0111410 | A1 | 6/2004 | Burgoon et al. | |
| 2004/0128001 | A1 | 7/2004 | Levin et al. | |
| 2004/0143645 | A1 | 7/2004 | Cheenath | |
| 2004/0186860 | A1 | 9/2004 | Lee et al. | |
| 2004/0193510 | A1 | 9/2004 | Catahan, Jr. et al. | |
| 2004/0199489 | A1 | 10/2004 | Barnes-Leon et al. | |
| 2004/0199536 | A1 | 10/2004 | Barnes Leon et al. | |
| 2004/0199543 | A1 | 10/2004 | Braud et al. | |
| 2004/0220952 | A1 | 11/2004 | Cheenath | |
| 2004/0230895 | A1 * | 11/2004 | Elza et al. | 715/511 |
| 2004/0249854 | A1 | 12/2004 | Barnes-Leon et al. | |
| 2004/0260534 | A1 | 12/2004 | Pak et al. | |
| 2004/0260659 | A1 | 12/2004 | Chan et al. | |
| 2004/0268299 | A1 | 12/2004 | Lei et al. | |
| 2005/0044068 | A1 * | 2/2005 | Vogel et al. | 713/200 |
| 2005/0050555 | A1 | 3/2005 | Exley et al. | |
| 2005/0065925 | A1 | 3/2005 | Weissman et al. | |
| 2005/0091098 | A1 | 4/2005 | Brodersen et al. | |
| 2005/0223022 | A1 | 10/2005 | Weissman et al. | |
| 2005/0283478 | A1 | 12/2005 | Choi et al. | |
| 2006/0095960 | A1 | 5/2006 | Arregoces et al. | |
| 2006/0100912 | A1 | 5/2006 | Kumar et al. | |

(56) References Cited

U.S. PATENT DOCUMENTS

| | | | |
|---|---|---|---|
| 2006/0136382 | A1 | 6/2006 | Dettinger et al. |
| 2006/0206834 | A1 | 9/2006 | Fisher et al. |
| 2007/0078705 | A1 | 4/2007 | Abels et al. |
| 2007/0088741 | A1 | 4/2007 | Brooks et al. |
| 2007/0124276 | A1 | 5/2007 | Weissman et al. |
| 2007/0130130 | A1 | 6/2007 | Chan et al. |
| 2007/0130137 | A1 | 6/2007 | Oliver et al. |
| 2007/0150303 | A1 | 6/2007 | Cheenath |
| 2007/0150546 | A1 | 6/2007 | Karakashian et al. |
| 2007/0226640 | A1 | 9/2007 | Holbrook et al. |
| 2008/0010243 | A1 | 1/2008 | Weissman et al. |
| 2008/0077566 | A1 | 3/2008 | Fell et al. |
| 2008/0082540 | A1 | 4/2008 | Weissman et al. |
| 2008/0082555 | A1 | 4/2008 | Salmon et al. |
| 2008/0082572 | A1 | 4/2008 | Ballard et al. |
| 2008/0082986 | A1 | 4/2008 | Cheenath et al. |
| 2008/0086358 | A1 | 4/2008 | Doshi et al. |
| 2008/0086447 | A1 | 4/2008 | Weissman et al. |
| 2008/0086479 | A1 | 4/2008 | Fry et al. |
| 2008/0086482 | A1 | 4/2008 | Weissman |
| 2008/0086514 | A1 | 4/2008 | Weissman et al. |
| 2008/0086567 | A1 | 4/2008 | Langen et al. |
| 2008/0086735 | A1 | 4/2008 | Cheenath et al. |
| 2008/0126333 | A1 | 5/2008 | Bezar et al. |
| 2008/0155310 | A1 | 6/2008 | Langen et al. |
| 2008/0162544 | A1 | 7/2008 | Weissman et al. |
| 2008/0201701 | A1 | 8/2008 | Hofhansl et al. |
| 2008/0215560 | A1 | 9/2008 | Bell et al. |
| 2008/0270354 | A1 | 10/2008 | Weissman |
| 2008/0270987 | A1 | 10/2008 | Weissman |
| 2009/0030906 | A1 | 1/2009 | Doshi et al. |
| 2009/0049065 | A1 | 2/2009 | Weissman |
| 2009/0049101 | A1 | 2/2009 | Weissman |
| 2009/0049102 | A1 | 2/2009 | Weissman |
| 2009/0049288 | A1 | 2/2009 | Weissman |
| 2009/0276395 | A1 | 11/2009 | Weissman et al. |
| 2009/0276405 | A1 | 11/2009 | Weissman et al. |
| 2009/0282045 | A1 | 11/2009 | Hsieh et al. |
| 2009/0319529 | A1 | 12/2009 | Bartlett et al. |
| 2010/0191719 | A1 | 7/2010 | Weissman et al. |
| 2010/0211619 | A1 | 8/2010 | Weissman et al. |
| 2010/0235837 | A1 | 9/2010 | Weissman et al. |
| 2010/0274779 | A1 | 10/2010 | Weissman et al. |

OTHER PUBLICATIONS

[online];[published on Oct. 16, 2008];[retrieved on Feb. 26, 2010]; retrieved from http://en.wikipedia.org/wiki/Customer_Realtionship_Management.
[online];[published on Apr. 22, 2008];[retrieved on Feb. 26, 2010]; retrieved from http://en.wikipedia.org/wiki/Flat_file_database.
[online];[published on Apr. 25, 2008];[retrieved on Feb. 26, 2010]; retrieved from http://en.wikipedia.org/wiki/Relational_database.
First named inventor: Doshi, Kedar, U.S. Appl. No. 12/167,991, filed Jul. 3, 2008.
First named inventor: Yancey, Scott, U.S. Appl. No. 12/197,979, filed Aug. 25, 2008.
First named inventor: Smith, Andrew, U.S. Appl. No. 12/369,710, filed Feb. 11, 2009.
First named inventor: Bezar, Eric, U.S. Appl. No. 12/569,603, filed Sep. 29, 2009.
First named inventor: Durdik, Paul, U.S. Appl. No. 12/549,349, filed Aug. 27, 2009.
First named inventor: Durdik, Paul, U.S. Appl. No. 12/092,721, filed Aug. 28, 2008.
First named inventor: Yancey, Scott, U.S. Appl. No. 12/636,658, filed Dec. 11, 2009.
First named inventor: Yancey, Scott, U.S. Appl. No. 12/636,675, filed Dec. 11, 2009.
First named inventor: Yancey, Scott, U.S. Appl. No. 12/720,538, filed Mar. 9, 2010.
First named inventor: Durdik, Paul, U.S. Appl. No. 12/369,710, filed Feb. 11, 2009.
First named inventor: Calahan, Patrick, U.S. Appl. No. 12/954,556, filed Nov. 24, 2010.
First named inventor: Varadharajan, Arunkumaran, U.S. Appl. No. 12/909,820, filed Oct. 21, 2010[.
First named inventor: Pin, Oliver, U.S. Appl. No. 12/895,833, filed Sep. 30, 2010.
First named inventor: Press, William A., U.S. Appl. No. 12/850,502, filed Aug. 4, 2010.
First named inventor: Tanaka, Jay, U.S. Appl. No. 12/831,209, filed Jul. 6, 2010.
First named inventor: Tanaka, Jay, U.S. Appl. No. 12/831,196, filed Jul. 6, 2010.
First named inventor: Williams, Alexis, U.S. Appl. No. 13/028,236, filed Feb. 16, 2011.
Notification of Transmittal of the International Search Report and the Written Opinion of the International Searching Authority, or the Declaration. International Application Number: PCT/US2010/050021. International Filing Date: Sep. 23, 2010.
Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.
Wermelinger et al: "Using coordination contracts for flexible adaptation to changing business rules", Proceedings of the Sixth International Workshop on Software Evolution, NJ, USA, Sep. 1, 2003, pp. 115-120.
Lee et al: "Composition of executable business process models by combining business rules and process flows", Expert Systems With Application, Oxford, GB, vol. 33, No. 1, Dec. 22, 2006, pp. 221-229.
Mietzer et al: "Combining Different Multi-tenancy Patterns in Service Oriented Applications", IEE International Enterprise Distributed Object Computing Conference, NJ, USA, Sep. 1, 2009, pp. 131-140.
Wang et al: "Integrated Constraint Violation Handling for Dynamic Services Composition", IEE International Conference on Services Computing, NJ, USA, Sep. 21, 2009, pp. 168-175.

* cited by examiner

METHOD AND SYSTEM FOR CONTROLLING ACCESS TO A MULTI-TENANT DATABASE SYSTEM USING A VIRTUAL PORTAL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to virtual portals used in a multi-tenant on demand architecture in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems.

Unfortunately, conventional database approaches might become inefficient if, for example, updating applications on the server if the relationship is relatively complex. A database system may also process a query relatively slowly if, for example, a relatively large number of users substantially concurrently access the database system.

Accordingly, it is desirable to provide techniques enabling an owner of the database system, to improve the ease of use of the database system.

BRIEF SUMMARY

In accordance with embodiments, there are provided techniques for controlling access to a multi-tenant database system using a virtual portal. These mechanisms and methods for controlling access to a multi-tenant database system using a virtual portal can enable embodiments to provide great flexibility to a tenant of the architecture to select the content that may be perceived by the tenant users while allowing the owner of the architecture control over the content.

In an embodiment and by way of example, a method of controlling access to a multi-tenant database system using a virtual portal is described. The method embodiment includes receiving from a first tenant, a request to permit at least one first tenant user to access a sub-portion of that portion of content authorized to the first tenant stored along with content authorized only to other tenants to form a multi-tenant database system, access to which database is provided to the first tenant and the other tenants on-demand. A portal display registry portion, corresponding to the first tenant, is configured to authorize at least one first tenant user to be permitted access to certain kinds of information. The first tenant user is permitted to perceive the sub-portion of that portion of content authorized to the first tenant through a portal, the sub-portion being defined by the portal display registry included with the multi-tenant database system, thereby facilitating access to a sub-portion of the first tenant's portion of content of the multi-tenant database system using an architecture common to the first tenant and to the first tenant user accessing through the portal.

The present invention is described with reference to an embodiment in which techniques for controlling access to a multi-tenant on demand architecture using a virtual portal. The application server provides a front end for an on-demand database service capable of supporting multiple tenants, the present invention is not limited to multi-tenant database systems nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for controlling access to a multi-tenant database system using a virtual portal. As used herein, the term multi-tenant database system (MTS) refers to those systems in which various elements of hardware and software of the database system may be shared by one or more users. For example, a given application server may simultaneously process requests for a great number of customers, and a given database table may store rows for a potentially much greater number of customers.

Figure 1:
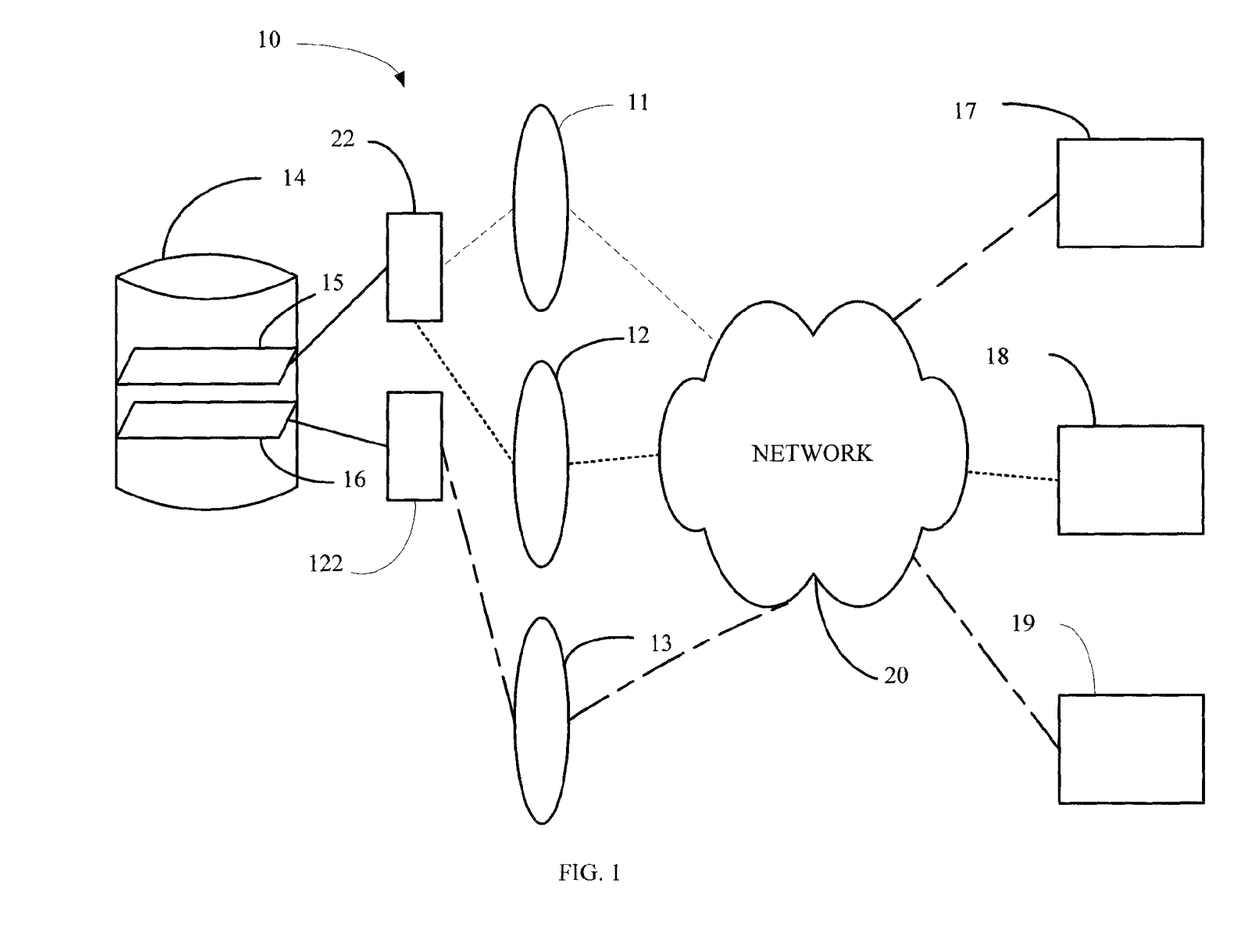
FIG. 1 illustrates a representative architecture for controlling access to a multi-tenant database system using a virtual portal in an embodiment.

FIG. 1 illustrates a database architecture 10 employing virtual portals 11, 12 and 13 in an MTS architecture that affords access to a database 14 having tenant information 15 and 16, associated with a tenant, by multiple users 17-19 over a data communication network 20. Architecture 10 includes information corresponding to more than one tenant, with the understanding that a tenant is an organization that obtains rights to store information on database 14 and make the same accessible to one or more users 17-19 to whom tenant provides authorization. This is typically achieved by rental agreements between the tenant and an owner/provider of architecture 10. In this manner, architecture 10 provides an on-demand database service to users 17-19 that are not necessarily be concerned with building and/or maintaining the database system; rather, these functions are addressed between the tenant and the owner/provider. Tenant information 15 and 16 may include software applications, application data, and the like. Although information corresponding to two different tenants is shown, in practice information corresponding to any number of tenants may be present.

Each virtual portal 11, 12 and 13 provides an "instance" of a portal user interface, coupled to allow access to database 14. With architecture 10, multiple users 17-19 may access information on database 14 through a common network address, in this example a universal resource locator (URL). In response web-pages and other content may be provided to users 17-19 over network 20. The resources of database 14 that users 17-19 may access can be different, depending on user's 17-19 security or permission level and/or tenant association. For example, in some MTSs, tenants may be allowed to provide users 17-19 associated with the tenant, referred to as tenant users, access to a sub-portion of the content of the database information that the tenant may be allowed to access. The sub-portion that any one of tenant users may access may be the same as or different from the sub-portion that the remaining tenant users may access. User's not associated with a tenant would not be allowed access to the tenant information. For example, assume users 17 and 18 are associated with the tenant corresponding to tenant information 15 and not associated with the tenant corresponding to tenant information 16. Users 17 and 18 would not be allowed access to tenant information 16 and would be allowed access to tenant information 15. Similarly, were user 19 associated with the tenant corresponding to tenant information 16 and not the tenant corresponding to tenant information 15, user 19 would be allowed to access tenant information 16 and not tenant information 15. It is possible, however, that one of users 17-19 are associated to the tenants corresponding to both sets of tenant information 15 and 16.

Data communication network 20 may be any network or combination of networks of devices that communicate with one another. For example, network 20 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol. As a result, users 17-19 may access the corresponding tenant information 15 and 16 from any location where network access is available.

An example of a tenant may be a company that employs a sales force where each salesperson uses server system 30 to manage their sales process. In this fashion, architecture facilitates Customer Relations Management (CRM). Thus, one or more of users 17-19 may be a salesperson that maintains information that is applicable to that salesperson's sales process and is different from information related to other salespersons' sales process. An example of sales process data may include, without limitation, contact data, leads data, customer follow-up data, performance data, goals and progress data applicable to that salesperson's personal sales process. The sales process information may be stored in tenant data storage 24. To facilitate management of this information, the tenant associated with the salesperson may restrict each salesperson access to specific sales process information. A tenant, however, may be able to view all sale process information for the salespersons associated therewith. This is referred to as a hierarchical data structure in which users at one permission level, in this example a tenant, may have access to applications, data, and database information accessible by a lower permission level user, in this example the salespersons, with the salesperson not having access to certain applications, database information, and data accessible by a user at a higher permission level, the tenant. In this fashion, the tenant may access all information that the tenants' user could access, in this example, salespersons; however, the tenant's user, in the present example a salesperson, is not necessarily allowed to access information of the tenant. Similarly, an administrator of the architecture 10 may access and control all information available to each of the tenants, as well as the tenant users associated with each tenant.

Tenant information 15 and 16 may viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, were database 14 a CRM database it would include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

To facilitate the hierarchical data structure, virtual portals 11, 12 and 13 each provides the functions to process queries from multiple different users. To this end, virtual portals 11, 12 and 13 facilitates restricting the resources of database 14 that a tenant may provide to users 17-19 associated with the tenant. Each user 17-19 logs into one of virtual portals 11, 12 and 13 to access resources of database 14 through a unique uniform resource locator (URL) or other type of address. Based on the URL and other identifying information associated with users 17-19, architecture 10 may determine the resources of database 14 users 17-19 may access. For example, user 17 communicates with database through virtual portal 11, user 18 communicates with database 14 through virtual portal 12, and user 19 communicates with database through virtual portal 13. It is possible, however, that all users 17-19 may use a common portal, as well. To that end, users desiring to access resources of database 14 employ virtual portals 11, 12 and 13 to validate against the information stored on system 10, corresponding to the user 17-19 requesting access.

One advantage of the hierarchical data structure allows a tenant to customize the resources that users 17-19 may access, as well as the web-pages and other rendering that the tenant users 17-19 may experience when accessing the resources of database 14. This may be achieved by tenant creating custom objects. Techniques for creating custom objects in a multi-tenant database system is disclosed in U.S. patent application Ser. No. 10/817,161, filed Apr. 2, 2004, entitled "Custom Entities and Fields in a Multi-Tenant Database System", which is incorporated herein by reference. In certain embodiments, for example, all custom entity data rows are stored in a single multi-tenant physical table, which may contain multiple logical tables per organization. It is transparent to tenants that multiple "tables" associated therewith are in fact stored in one large table or that their data may be stored in the same table as the data of other tenants. In part, this customization may be provided by a tenant modifying common interface components, such as, a login screen, a system error screen, a paging user interface, branding information, and the like. This allows, for example, the tenant to vary the "look and feel" of the computing experience of users 17-19. It is desired, however, that the owner of database 14 control resources, as well as the look-and-feel that the tenant may provide to users 17-19. Otherwise, this may result in the tenant's users have access equal to the tenant. This is undesirable from a business perspective.

The owner/provider of database 14 maintains control over the resources, as well as, the look-and-feel of the computing experience a tenant may provide to users 17-19 through the use of one or more portal display registries (PDR) 22 and 122. To that end, PDRs 22 and 122 each includes exceptions to the experience of users 17-19. Communication with database 14 through virtual portals 11, 12 and 13 occurs in coordination with the functions of PDRs 22 and 122. The resources and content to be provided to users 17-19 is compared to information in the appropriate PDRs 22 and 122 to determine whether the resources and content is appropriate. In this manner, PDRs 22 and 122 function as a gateway and identifies and restricts the resources and content may be provided to users 17-19, even though the same resources and content may be provided to the tenant that users 17-19 are associated. The tenant may control, subject to the restrictions of the provider/owner of database 14, the computing experience of tenant users 17-19. To that end, relational database management system (RDMS) or the equivalent may execute storage and retrieval of information against the database object(s). In the present example, each set of tenant information is uniquely associated with a separate PDR 22 and 122. Tenant information 15 is associated with PDR 22, and tenant information 16 is associated with PDR 122. Assuming that users 17 and 18 are associated with a tenant corresponding to tenant information 15 and user 19 is associated with the tenant corresponding to tenant information 16. Requests for access to database 14 would be transmitted via virtual portals 11 and 12, respectively. In response to the request a sub-portion of tenant information 15, which is the subject of the request transmitted to users 17 and 18. However, this is subject to the restrictions set forth in PDR 22. Thus, all content transmitted to users 17 and 18 are subject to the restrictions set forth in PDR 22. Similarly, all content transmitted from database 14 to user 19 is subject to the restrictions set forth in PDR 122. Requests from user 19 for a sub-portion of tenant information 16 occur through virtual portal 13.

Were it determined that the resources and content to be provided to users 17-19 was improper, in one embodiment architecture 10 would merely restrict this information from being made available to users 17-19. The remaining resources and content that are the subject of the users 17-19 request for access would be provided. The tenant associated with the users 17-19 could be made aware of that one or more of users 17-19 had attempted to access resources of database 14 that users 17-19 were not authorized to access. This may be achieved, for example, through owner/provider transmitting an e-mail message, an instant message, and/or a letter to the address of tenant. Of course, notification to the tenant by the owner/provider may be avoided altogether. Alternatively, were it determined that the resources and content to be provided to users 17-19 was improper, architecture 10 would restrict any resources of database 14 from being accessed by the users 17-19 requesting access, including resources and content that would otherwise be proper for the requesting user 17-19 to access. Notification to the tenant of the situation may or may not occur as discussed above.

Figure 2:
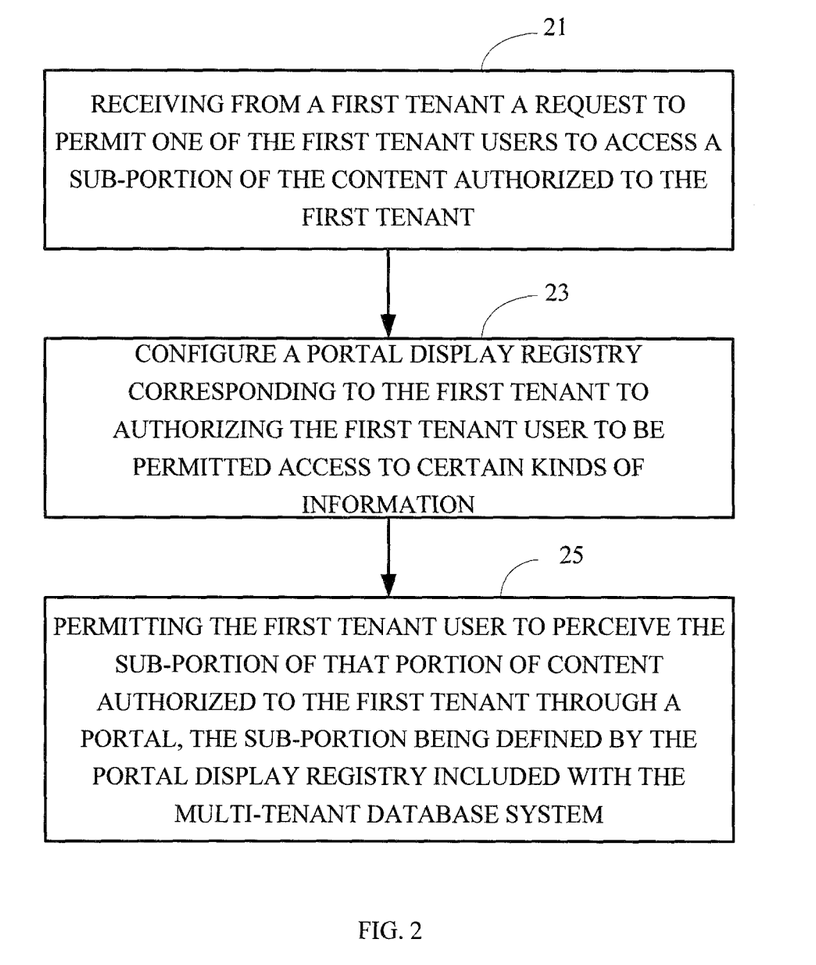
FIG. 2 is an operational flow diagram illustrating a high level overview of a method controlling access to a multi-tenant database system using a virtual portal in an embodiment.

Referring to FIGS. 1 and 2, in operation architecture would receive, from a first tenant, a request to permit one of users 17-19 to access a sub-portion of the content contained on database 14, at function 21. The content with which the sub-portion is associated is that portion of the total content of database that the tenant in authorized to grant access. In the present example it is presumed that the tenant is associated with tenant information 15. At function 23, PDR 22 would be configured to authorize one of users 17-19 to access to certain kinds of information amongst the sub-portion. PDR would usually be configured by the owner/provider and the kinds of information may be any information desired. The information that the owner/provider would allow users 17-19 would typically depend upon the desires of the owner/provider and could be subject to contract negotiations with the tenant associated with tenant information 15. At function 25 the tenant user 17-19 would be permitted to perceive the sub-portion of that portion of content authorized to the first tenant through virtual portal 12.

Figure 3:
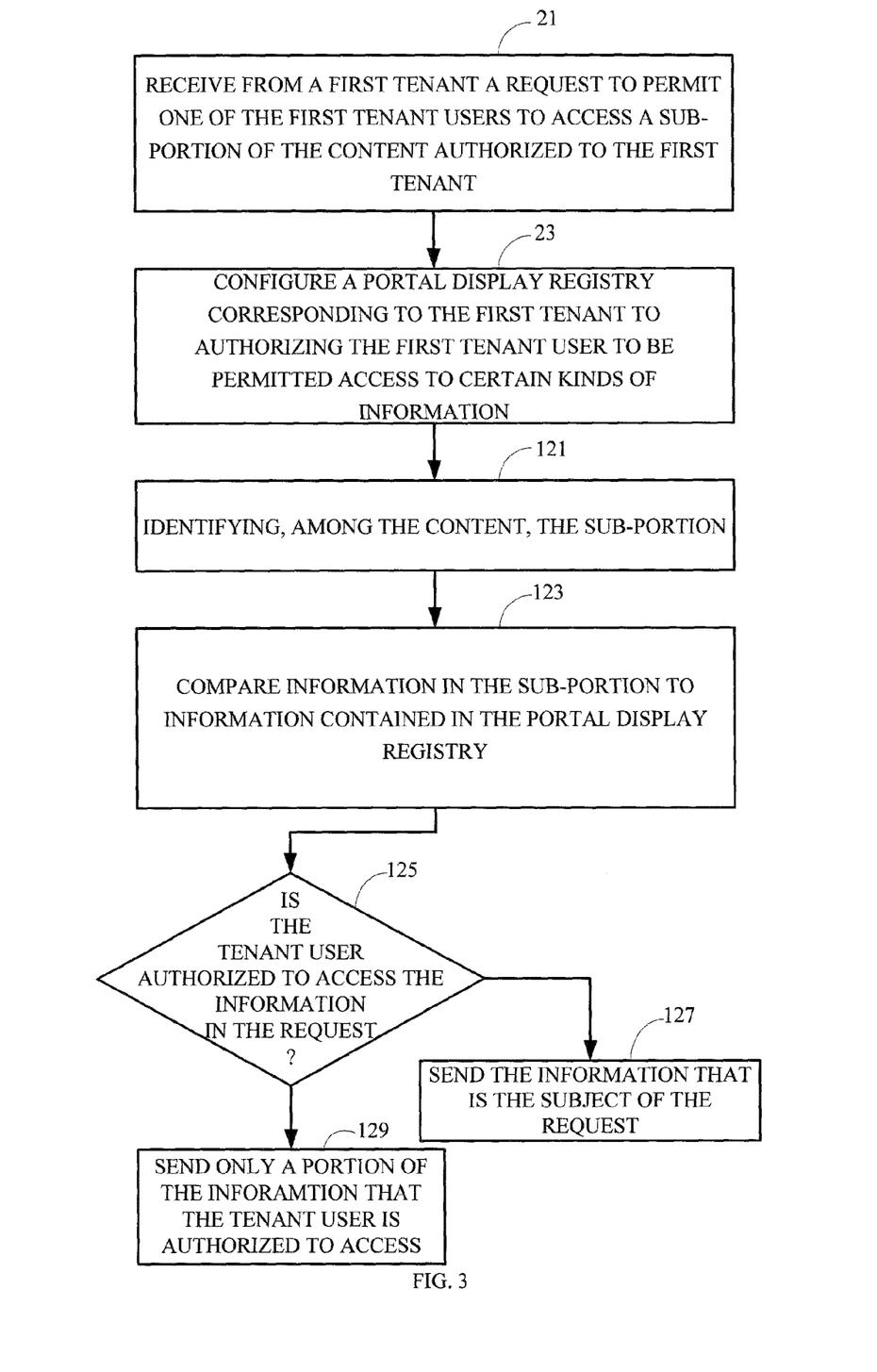
FIG. 3 is a detailed operational flow diagram illustrating additional functions carried-out in the operational flow diagram of FIG. 2.

Referring to both FIGS. 2 and 3, details of function 25 are shown in further detail. Specifically, after function 23, function 121 is carried out during which the sub-portion of the content that the tenant is authorized to access is identified. At function 123, the information in the sub-portion is compared to the information contained in PDR 22. At function 125 it is determined whether the tenant user 17-19 is authorized to access the information in the request. If yes then function 127 is carried-out during which the information that was the subject of the request is transmitted. Otherwise, function 129 is carried-out wherein only that portion of the information to which the tenant user 17-19 may access is transmitted. In an alternative embodiment, a notification of denial to access to a portion of the information may be transmitted, as discussed above.

Figure 4:
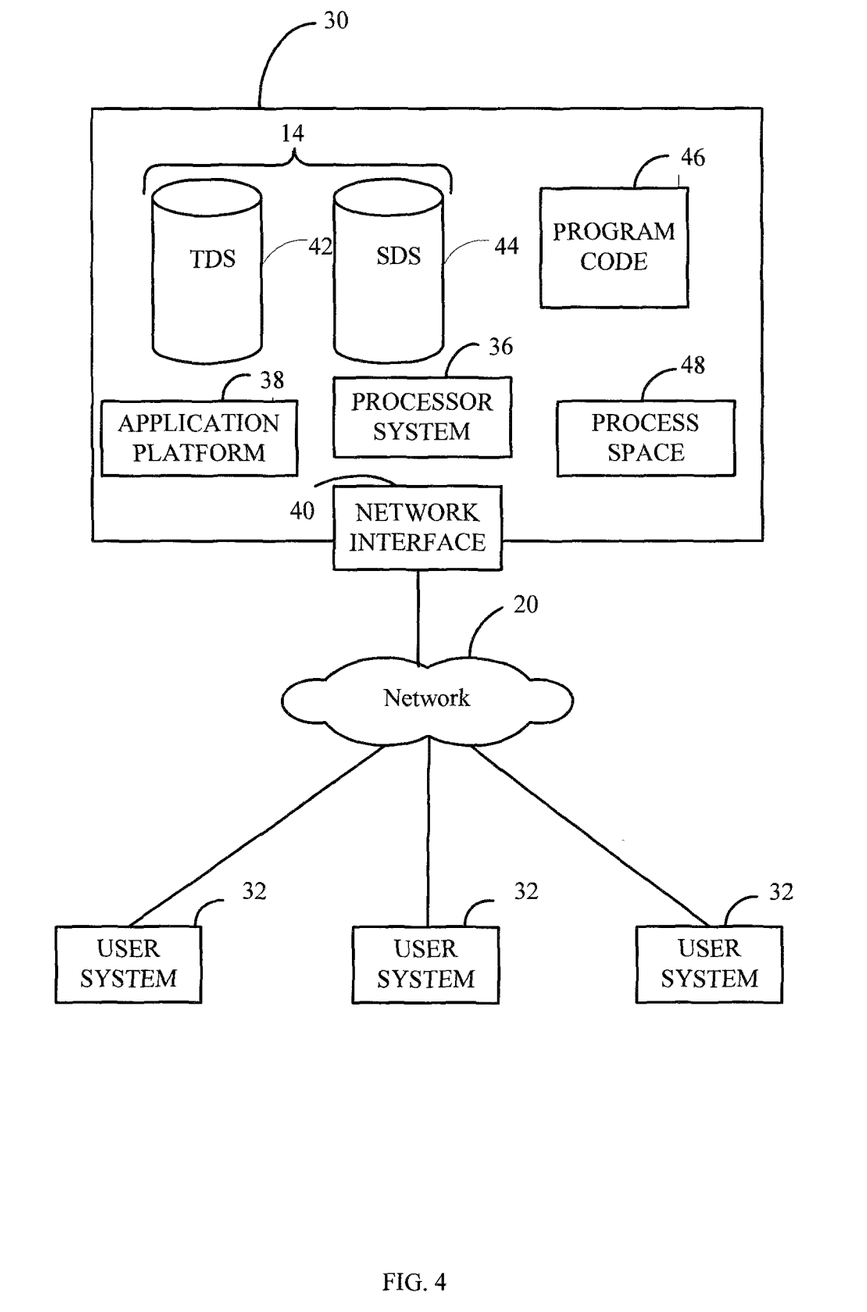
FIG. 4 illustrates a block diagram of an example of a representative system in which the architecture, shown in FIG. 1. may be practiced.
Figure 5:
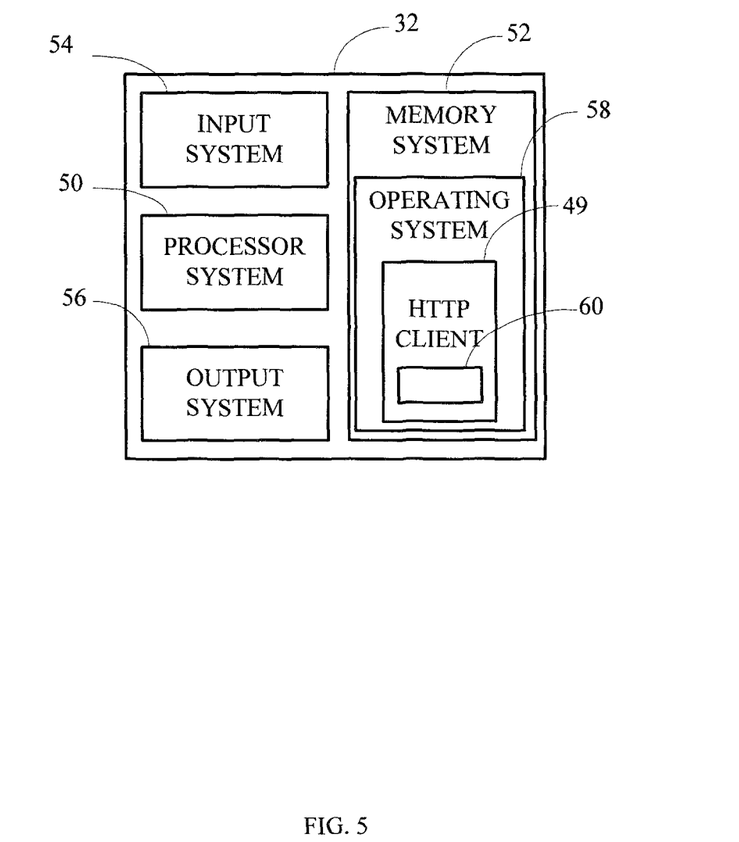
FIG. 5 is a detail block diagram of a user system, shown in FIGS. 1 and 4.

Referring to FIGS. 1, 4 and 5 a block diagram of a server system 30 employed to implement architecture 10 is shown as including multiple user systems 32 in data communication with server system 30 over network 20. Server system 30 includes a processor system 36, application platform 38, network interface 40, database 14, which includes tenant data storage 42, system data storage 44. In addition server system 30 includes program code 46, and process space 48. Program code 46 may include, among other code, code to facilitate a tenant to control the look-and-feel of the experience users 17-19 have when accessing database 14. Process space 48 facilitates execution of MTS system processes and tenant-specific processes, such as running applications as part of an application hosting service. Additional processes that may execute on server system 30 include database indexing processes. In other embodiments, server system 30 may not have all of the components listed and/or may have other elements instead of, or in addition to, those listed above. Server system 30, and additional instances of an MTS, where more than one is present, and all components thereof may be operator configurable using applications including computer code to run using a central processing unit such as processor system 36, which may include an Intel Pentium® processor or the like, and/or multiple processor units.

Application platform 38 may be a framework that allows the applications of architecture 10 to run, such as the hardware and/or software, e.g., the operating system. In an embodiment, application platform 38 may enable creation, managing and executing one or more applications developed by the owner/provider of architecture 10, users 17-19 accessing architecture 10 via user systems 32, or third party application developers accessing architecture 10 via user systems 32.

In one embodiment, server system 30 implements a web-based customer relationship management (CRM) system. For example, in one embodiment, server system 30 includes application servers configured to implement and execute CRM software applications as well as provide related data, code, forms, webpages and other information to and from user systems 32 and to store to, and retrieve from, a database system related data, objects, and Webpage content. Architecture 10 typically stores data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 30 implements applications other than, or in addition to, the CRM application discussed above. For example, server system 30 may provide tenant access to multiple hosted (standard and custom) applications, including a CRM application. User (or third party developer) applications, which may or may not include CRM, may be supported by the application platform 38, which manages creation, storage of the applications into one or more database objects and executing of the applications in a virtual machine in the process space of server system 30.

To facilitate web-based CRM, user systems 32 might communicate with server system 30 using TCP/IP and, at a higher network level, use other common Internet protocols to communicate, such as HTTP, FTP, AFS, WAP, etc. To that end, user systems 32 may be any computing device capable of interfacing directly or indirectly to the Internet or other network connection, such as desktop personal computer, workstation, laptop, PDA, cell phone, or any wireless access protocol (WAP) enabled device and the like running an HTTP client 49. An example of a user system 32 includes a processor system 50, a memory system 52, an input system 54, and output system 56. Processor system 50 may be any combination of one or more processors. Memory system 52 may be any combination of one or more memory devices, short term, and/or long term memory. A portion of memory system is used to run operating system 58 in which HTTP client 49 executes. Input system 54 may be any combination of input devices, such as one or more keyboards, mice, trackballs, scanners, cameras, and/or interfaces to networks. Output system 56 may be any combination of output devices, such as one or more monitors, printers, and/or interfaces to networks. HTTP client 49 allows users 17-19 of users systems 32 to access, process and view information, pages and applications available to it from server system 30 over network 20. Examples of HTTP client 49 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 15 and 16 by entering the URL (not shown) into the URL box 60 of HTTP client 49. The URL directs users 17-19 to the appropriate virtual portal for to determine authorization and permission level to access the requisite tenant information.

Data corresponding with each user 17-19 may be separate from the data corresponding to the remaining users 17-19 regardless of the tenant associated with users 17-19; however, some data might be shared or accessible by a plurality of users 17-19 or all of users 17-19 associated with a tenant. Thus, there might be some data structures managed by server system 30 that are allocated at the tenant level while other data structures might be managed at the user level. Because an MTS typically support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 30 might also maintain system level data usable by multiple tenants or other data. Such system level data might include industry reports, news, postings, and the like that are sharable among tenants.

According to one embodiment, server system 30 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
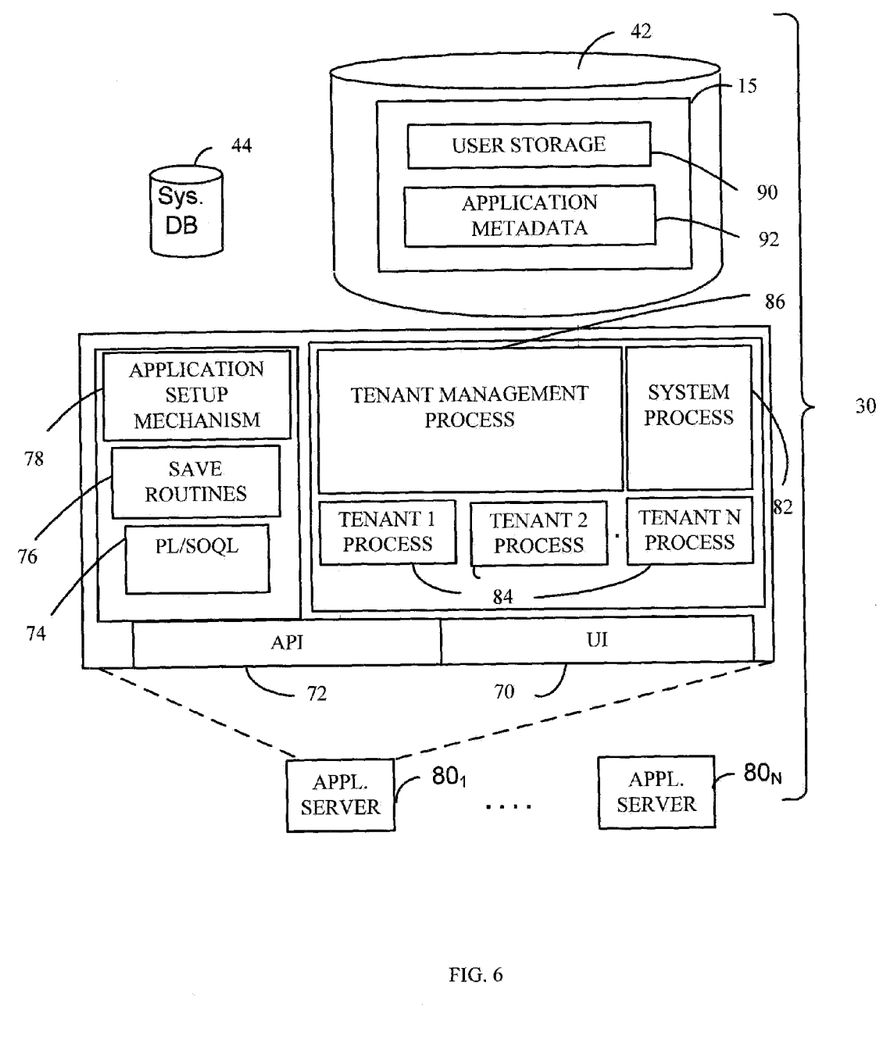
FIG. 6 illustrates a block diagram of an embodiment of elements of FIG. 4 and various possible interconnections between these elements.

Referring to FIG. 6, a specific embodiment of a server system 30 may include tenant data storage 42 and system data storage 44, which are as discussed above. In addition, server system 130 includes a user interface (UI) 70, application program interface (API) 72, PL/SOQL 74, save routines 76, an application setup mechanism 78, applications servers $80_1$-$80_N$, system process space 82, tenant process spaces 84, tenant management process space 86, tenant information 88, user storage 90, and application metadata 92. In other embodiments, server system 30 may not have the same elements as those listed above and/or may have other elements instead of, or in addition to, those listed above. Network interface is implemented as a plurality of HTTP application servers $80_1$-$80_N$. Also shown is system process space 82, including individual tenant process spaces 84 and a tenant management process space 86.

Referring to both FIGS. 4 and 6, each application server $80_1$-$80_N$ may be configured to serve requests of user systems 32 for access to tenant data storage 42 and the tenant information 15 and 16, as well as data system storage 44. Tenant information 15 and 16 consists of different information storage areas that may physical differentiation, e.g., different hard disks, and/or a logical separation of the information. Within each tenant storage area 16 and 17, information may be included therein that consists of user storage 90 and application metadata 92 for each user or a groups of users. For example, a copy of a user's most recently used (MRU) items might be stored to user storage 90. Similarly, a copy of MRU items for an entire organization that is a tenant might be stored to tenant storage area 88. UI 70 provides a user interface and API 72 provides an application programmer interface to server system 30 resident processes to users and/or developers at user systems 32. The tenant data and the system data may be stored in various databases, such as one or more Oracle™ databases.

It is not necessary that the one or more HTTP application servers $80_1$-$80_N$ be implemented as the sole network interface between server system 30 and network 20. Rather, other communication techniques might be used in conjunction with HTTP application servers $80_1$-$80_N$ or in lieu thereof. In some implementations, the interface between server system 30 and network 20 includes load sharing functionality, such as round-robin HTTP request distributors to balance loads and distribute incoming HTTP requests evenly over a plurality of servers. At least as for users 17-19 one of HTTP application servers $80_1$-$80_N$, each of the plurality of servers has access to the MTS data; however, other alternative configurations may be used instead.

Application platform 38 includes an application setup mechanism 78 that supports application developers' creation and management of applications, which may be saved as metadata into tenant data storage 24 by save routines 76 for execution by subscribers as one or more tenant process spaces 84 managed by tenant management process 86, for example. Invocations to such applications may be coded using PL/SOQL 34 that provides a programming language style interface extension to API 72. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 92 for the subscriber making the invocation and executing the metadata as an application in a virtual machine.

Each HTTP application servers $80_1$-$80_N$ may be communicably coupled to database systems, e.g., having access to system data 34 and tenant data 32, via a different network connection. For example, one HTTP application server $80_1$ might be coupled via the network 20 (e.g., the Internet), another HTTP application servers $80_1$-$80_N$ might be coupled via a direct network link, and another one of HTTP application servers $80_1$-$80_N$ might be coupled by yet a different network connection. Transfer Control Protocol and Internet Protocol (TCP/IP) are typical protocols for communicating between HTTP application servers $80_1$-$80_N$ and database 14. However, it will be apparent to one skilled in the art that other transport protocols may be used to optimize the system depending on the network interconnect used.

In certain embodiments, each of HTTP application servers $80_1$-$80_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers $80_1$-$80_N$. In one embodiment, therefore, an interface system implementing a load balancing function (e.g., an F5 Big-IP load balancer) is communicably coupled between HTTP application servers $80_1$-$80_N$ and the user systems 32 to distribute requests to HTTP application servers $80_1$-$80_N$. In one embodiment, the load balancer uses a least connections algorithm to route user requests to HTTP application servers $80_1$-$80_N$. Other examples of load balancing algorithms, such as round robin and observed response time, also can be used. For example, in certain embodiments, three consecutive requests from the same user 17-19 could hit three different HTTP application servers $80_1$-$80_N$, and three requests from different user systems 32 could hit a common HTTP application server $80_1$-$80_N$. In this manner, server system 30 is multi-tenant, wherein server system 30 handles storage of, and access to, different objects, data and applications across disparate users and organizations.

In certain embodiments, user systems 32 (which may be client systems) communicate with HTTP application servers $80_1$-$80_N$ to request and update system-level and tenant-level data from server system 30 that may require sending one or more queries to tenant data storage 24 and/or system data storage 26. Server system 30 (e.g., an application server 80 in server system 30) automatically generates one or more SQL statements (e.g., one or more SQL queries) that are designed to access the desired information. System data storage 26 may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein. Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A method for controlling access to a multi-tenant database system using a virtual portal, the multi-tenant database system to provide a customer relationship management (CRM) system via one or more server computing system that provide CRM applications, related data, code, forms pages and database system related data, objects and content, wherein the system stores data for multiple tenants in the same physical database object with tenant data arranged so that data corresponding to respective tenants is kept logically separate from that of other tenants so that one tenant does not have access to another tenant's data unless such data is expressly shared, the method comprising:
receiving from one of a plurality of tenants, a request to permit at least one first tenant user to access a sub-portion of authorized content on the database authorized to the one of a plurality of tenants to access, which is stored with remaining content authorized to remaining tenants of the plurality of tenants to access on-demand;
configuring a plurality of portal display registries to be associated with one of the plurality of tenants such that anyone of the plurality of tenants is associated with a display registry that is different from the portal display registry associated with the remaining tenants of the plurality of tenants storing in one of the plurality of portal display registries information identifying accessible content that may be accessed by the tenant associated therewith and a subpart of the accessible content that the tenant may not allow the at least one first tenant user to access, with the accessible content including said authorized content and the sub-part including content provided by an owner of the multi-tenant based system; and
permitting the at least one first tenant user to access the sub-portion through a portal in response to determining that the sub-portion is not included in the sub-part.

2. The method of claim 1, further comprising:
permitting a second tenant user to access a second sub-portion of the remaining content through an additional portal, the second sub-portion being defined in an additional portal display registry of the plurality of display registries included with the multi-tenant database system associated with a second tenant of the plurality of tenants.

3. The method of claim 1, wherein receiving further includes:
receiving from the one of a plurality of tenants, a request to permit additional tenant users to access the sub-portion.

4. The method of claim 1, wherein receiving further includes:
receiving from the one of a plurality of tenants, a request to permit additional tenant users to access a segment of the sub-portion, with the at least one first tenant user and the additional tenant users defining a plurality of tenant users, with the information contained in the segment perceived by one of the plurality of tenant users being different from the information contained in the segment perceived by the remaining tenant users of the plurality of tenant users.

5. The method as recited in claim 1, wherein permitting further includes:
permitting a second tenant user to perceive a second sub-portion of the remaining content through an additional portal, the second sub-portion being defined in an additional portal display registry included with the multi-tenant database system associated with a second tenant of the plurality of tenants, with the at least one first tenant user accessing the first sub-portion through a uniform resource locator (URL) that is different than a URL through which the second tenant user communicates with the database.

6. The method of claim 1, wherein permitting further includes:
receiving a communication from the at least one first tenant user requesting access to the sub-portion;
identifying, among the authorized content, the sub-portion;
comparing information in the sub-portion to information contained in the one of a plurality of portal display registries to determine whether information in the sub-portion may be transmitted to the at least one first tenant user; and
sending the information in the sub-portion in response to determining that the at least one first tenant user is authorized to perceive the information in the sub-portion.

7. The method of claim 1, wherein permitting further includes providing, in the sub-portion, first branding information that is perceivable by the one of a plurality of tenants and allowing further includes providing to the at least one first tenant user second branding information that is defined by the one of a plurality of tenants.

8. The method of claim 1, wherein permitting further includes providing, in the sub-portion, first branding information that is perceivable by the one of a plurality of tenants and allowing further includes providing to the at least one first tenant user second branding information that is different than the first branding information.

9. The method of claim 1, wherein permitting further includes providing, in the sub-portion, first branding information that is perceivable by the one of a plurality of tenants and allowing further includes providing to a plurality of first tenant users, additional branding information that is different than the first branding information, with the additional branding information perceived by one of the plurality of first tenant users being different from the branding information perceived by the remaining first tenant users of the plurality of first tenant users.

10. A non-transitory machine-readable medium carrying one or more sequences of instructions for controlling access to a multi-tenant database system using a virtual portal, the multi-tenant database system to provide a customer relationship management (CRM) system via one or more server computing system that provide CRM applications, related data, code, forms pages and database system related data, objects and content, wherein the system stores data for multiple tenants in the same physical database object with tenant data arranged so that data corresponding to respective tenants is kept logically separate from that of other tenants so that one tenant does not have access to another tenant's data unless such data is expressly shared, which instructions, when executed by one or more processors, cause the one or more processors to carry out the steps of:
receiving from one of a plurality of tenants, a request to permit at least one first tenant user to access a sub-portion of authorized content on the database authorized to the one of a plurality of tenants to access, which is stored with remaining content authorized to remaining tenants of the plurality of tenants to access on-demand;
configuring a plurality of portal display registries to be associated with one of the plurality of tenants such that anyone of the plurality of tenants is associated with a display registry that is different from the portal display registry associated with the remaining tenants of the plurality of tenants storing in one of the plurality of portal display registries information identifying accessible content that may be accessed by the tenant associated therewith and a subpart of the accessible content that the tenant may not allow the at least one first tenant user to access, with the accessible content including said authorized content and the sub-part including content provided by an owner of the multi-tenant based system; and
permitting the at least one first tenant user to access the sub-portion through a portal in response to determining that the sub-portion is not included in the sub-part.

11. The non-transitory machine-readable medium as recited in claim 10, further including instructions for carrying out the step of:
permitting a second tenant user to access a second sub-portion of the remaining content through an additional portal, the second sub-portion being defined in an additional portal display registry of the plurality of display registries included with the multi-tenant database system associated with a second tenant of the plurality of tenants.

12. The non-transitory machine-readable medium as recited in claim 10, further including instructions for carrying out the step of:
allowing a plurality of first tenant users to access a segment of the sub-portion, with the information contained in the segment perceived by one of the plurality of first tenant users being different from the information contained in the segment perceived by the remaining first tenant users of the plurality of tenant users.

13. The non-transitory machine-readable medium as recited in claim 10, wherein the instructions to carrying out the step of permitting further includes instructions for carrying out the step of:
permitting a second tenant user to perceive a second sub-portion of the remaining content through an additional portal, the second sub-portion being defined in an additional portal display registry included with the multi-tenant database system associated with a second tenant of the plurality of tenants, with the at least one first tenant user accessing the first sub-portion through a uniform resource locator (URL) that is different than a URL through which the second tenant user communicates with the database.

14. The non-transitory machine-readable medium as recited in claim 10, wherein the instructions to carrying out the step of permitting further includes instructions for carrying out the steps of:
receiving a communication from the at least one first tenant user for access to the sub-portion;
identifying, among the authorized content, the sub-portion;
comparing information in the sub-portion to information contained in the one of a plurality of portal display registries to determine whether information in the sub-portion may be transmitted to the at least one first tenant user; and
sending the information in the sub-portion in response to determining that the at least one first tenant user is authorized to perceive the information in the sub-portion.

15. The non-transitory machine-readable medium as recited in claim 10, wherein the instructions to carrying out the step of permitting further includes instructions for carrying out the step of providing, in the sub-portion, first branding information that is perceivable by the at least one first tenant and the instructions for allowing further include instructions to carry out the step of providing to the at least one first tenant user second branding information that is defined by the one of a plurality of tenants.

16. The non-transitory machine-readable medium as recited in claim 10, wherein the instructions to carrying out the step of permitting further includes instructions for carrying out the step of providing, in the sub-portion, first branding information that is perceivable by the one of a plurality of tenants and the instructions for carrying out the step of allowing further includes instructions for carrying out the step of providing, to the at least one first tenant user, second branding information that is different than the first branding information.

17. The non-transitory machine-readable medium as recited in claim 10, wherein the instructions to carrying out the step of permitting further includes instructions for carrying out the step of providing, in the sub-portion, first branding information that is perceivable by the one of a plurality of tenants and the instructions for carrying out the step of allowing further includes instructions for carrying-out the step of providing to a plurality of first tenant users, additional branding information that is different than the first branding information, with the additional branding information perceived by one of the plurality of first tenant users being different from the branding information perceived by the remaining first tenant users of the plurality of first tenant users.

18. An apparatus for controlling access to a multi-tenant database system using a virtual portal, the multi-tenant database system to provide a customer relationship management (CRM) system via one or more server computing system that provide CRM applications, related data, code, forms pages and database system related data, objects and content, wherein the system stores data for multiple tenants in the same physical database object with tenant data arranged so that data corresponding to respective tenants is kept logically separate from that of other tenants so that one tenant does not have access to another tenant's data unless such data is expressly shared, the apparatus comprising:

a processor; and one or more stored sequences of instructions which, when executed by the processor, cause the processor to carry out the steps of:

receiving from one of a plurality of tenants, a request to permit at least one first tenant user to access a sub-portion of authorized content on the database authorized to the one of a plurality of tenants to access, which is stored with remaining content authorized to remaining tenants of the plurality of tenants to access on-demand;

configuring a plurality of portal display registries to be associated with one of the plurality of tenants such that anyone of the plurality of tenants is associated with a display registry that is different from the portal display registry associated with the remaining tenants of the plurality of tenants storing in one of the plurality of portal display registries information identifying accessible content that may be accessed by the tenant associated therewith and a subpart of the accessible content that the tenant may not allow the at least one first tenant user to access, with the accessible content including said authorized content and the sub-part including content provided by an owner of the multi-tenant based system; and permitting the at least one first tenant user to access the sub-portion through a portal in response to determining that the sub-portion is not included in the sub-part.

19. A method for transmitting code, for controlling access to a multi-tenant database system using a virtual portal, the multi-tenant database system to provide a customer relationship management (CRM) system via one or more server computing system that provide CRM applications, related data, code, forms pages and database system related data, objects and content, wherein the system stores data for multiple tenants in the same physical database object with tenant data arranged so that data corresponding to respective tenants is kept logically separate from that of other tenants so that one tenant does not have access to another tenant's data unless such data is expressly shared, on a transmission medium, the method comprising:

transmitting code to receive from one of a plurality of tenants, a request to permit at least one first tenant user to access a sub-portion of authorized content on the database authorized to the one of a plurality of tenants to access, which is stored with remaining content authorized to remaining tenants of the plurality of tenants to access on-demand;

transmitting code to configure one of a plurality of portal display registries to be associated with one of the plurality of tenants such that anyone of the plurality of tenants is associated with a display registry that is different from the portal display registry associated with the remaining tenants of the plurality of tenants transmitting code to store in one of the plurality of portal display registries information identifying accessible content that may be accessed by the tenant associated therewith and a sub-part of the accessible content that the tenant may not allow the at least one first tenant user to access, with the accessible content including said authorized content and the sub-part including content provided by an owner of the multi-tenant based system; and transmitting code to permit the at least one first tenant user to access the subportion through a portal in response to determining that the sub-portion is not included in the sub-part.

* * * * *